(12) United States Patent
Olsson et al.

(10) Patent No.: US 9,117,297 B2
(45) Date of Patent: Aug. 25, 2015

(54) REDUCED ON-CHIP MEMORY GRAPHICS DATA PROCESSING

(75) Inventors: Per-Daniel Olsson, Lund (SE); Aleksandar Filipov, Malmö (SE); Marcus Dan Anders Lorentzon, Lund (SE)

(73) Assignee: ST-Ericsson SA, Plan-les-Ouates (CH)

( * ) Notice: Subject to any disclaimer, the term of this patent is extended or adjusted under 35 U.S.C. 154(b) by 1229 days.

(21) Appl. No.: 12/706,957

(22) Filed: Feb. 17, 2010

(65) Prior Publication Data

US 2011/0199391 A1 Aug. 18, 2011

(51) Int. Cl.
*G06T 1/60* (2006.01)
*G09G 5/393* (2006.01)

(52) U.S. Cl.
CPC . *G06T 1/60* (2013.01); *G09G 5/393* (2013.01)

(58) Field of Classification Search
None
See application file for complete search history.

(56) References Cited

U.S. PATENT DOCUMENTS

| | | | |
|---|---|---|---|
| 6,400,851 B1 | 6/2002 | Shih | |
| 7,671,865 B2* | 3/2010 | Willis et al. | 345/545 |
| RE41,967 E * | 11/2010 | Ishii et al. | 345/568 |
| 7,876,977 B2* | 1/2011 | Walton et al. | 382/296 |
| 2005/0134597 A1 | 6/2005 | Tillery et al. | |
| 2005/0225556 A1 | 10/2005 | Booth, Jr. | |
| 2007/0030292 A1 | 2/2007 | Pai et al. | |
| 2007/0124474 A1 | 5/2007 | Margulis | |
| 2007/0139445 A1* | 6/2007 | Khan et al. | 345/649 |
| 2007/0257925 A1 | 11/2007 | Brunner et al. | |
| 2009/0092329 A1 | 4/2009 | Huang | |
| 2010/0111440 A1* | 5/2010 | Chai et al. | 382/275 |
| 2011/0080418 A1* | 4/2011 | Rhodes | 345/522 |

FOREIGN PATENT DOCUMENTS

WO 2007/075294 A1 7/2007

OTHER PUBLICATIONS

Capin et al. "The State of the Art in Mobile Graphics Research." IEEE Computer Graphics and Applications; Jul. 1, 2008; pp. 74-84; vol. 28, No. 4; IEEE Service Center, New York, NY.
Akenine-Moller et al. "Graphics Processing Units for Handhelds." Proceeding of the IEEE; May 1, 2008; pp. 779-789; vol. 96, No. 5; IEEE, New York, NY.

* cited by examiner

*Primary Examiner* — Maurice L McDowell, Jr.
(74) *Attorney, Agent, or Firm* — Coats & Bennett, PLLC

(57) ABSTRACT

An electronic device as taught herein offers reduced on-chip memory processing of graphics data, while also offering low memory bandwidth requirements. The electronic device includes a host block with off-chip memory, a graphics processing block with on-chip memory, a display controller, and a graphics display. The off-chip memory stores a frame of graphics data. The graphics processing block processes that frame of graphics data in blocks, or "tiles," of graphics data. For each tile, the graphics processing block fetches rendering instructions and graphics data corresponding to that tile from the off-chip memory, stores the graphics data in the on-chip memory, and renders pixel values for the tile by processing the graphics data in accordance with the rendering instructions. The graphics processing block then sends the rendered pixel values for the tile directly to the display controller and partially updates the graphics display memory with those rendered pixel values.

33 Claims, 3 Drawing Sheets

REDUCED ON-CHIP MEMORY GRAPHICS DATA PROCESSING

TECHNICAL FIELD

The present invention generally relates to the processing of graphics data, and particularly relates to methods and apparatus for processing graphics data with reduced on-chip memory and memory bandwidth.

BACKGROUND

An electronic device having a display typically includes a graphics processing block with on-chip memory and processing resources dedicated to processing graphics data. This kind of architecture relieves the burden of graphics processing from the electronic device's main system memory and processing resources, thereby improving system performance.

Conventionally, however, efficient processing of graphics data requires the on-chip memory to be comparable in size to the resolution of the graphics display. Integrating an on-chip memory onto the graphics processing chip is therefore especially costly for devices that have moderate to high resolution graphics displays. Further, the size of the on-chip memory significantly affects the physical area occupied by the chip in the electronic device, imposing substantial challenges for mobile electronic devices where the available physical area is limited.

Yet even if the on-chip memory can be reduced in size, the available memory bandwidth (the rate at which data can be read from or stored into the on-chip memory) might nonetheless constrain the performance of the electronic device. That is, reducing the size of the on-chip memory may require an increase in memory transactions for processing a given amount of graphics data in a certain amount of time. Clock rates and/or data bus widths must be increased to support this increase in memory bandwidth, which in turn increases the power consumption of the electronic device. Again this imposes significant limitations on how much the on-chip memory can be reduced, especially in mobile electronic devices where power consumption is of great concern.

SUMMARY

Teachings presented herein offer reduced on-chip memory processing of graphics data, while also offering low memory bandwidth requirements. The teachings process a frame of graphics data in individual blocks, or "tiles," of graphics data rather than as a whole, and thereby require a reduced amount of on-chip memory. Moreover, the teachings send pixel values rendered for each tile directly to the graphics display controller, rather than back to storage off-chip, and partially update the graphic display memory. In doing so, the teachings reduce the number of memory transactions required to process each tile.

In particular, an electronic device as taught herein is configured for reduced on-chip memory processing of a frame of graphics data stored in off-chip memory. The electronic device includes a host block that includes the off-chip memory and that may further include a host processor. The device also includes a graphics processing block with on-chip memory dedicated to processing the frame of graphics data. The graphics processing block processes the frame of graphics data tile-by-tile. For each tile, the graphics processing block fetches rendering instructions and graphics data corresponding to the tile from the off-chip memory. The graphics processing block stores the graphics data for the tile in the on-chip memory and then renders pixel values for the tile, by processing the graphics data according to the rendering instructions. Such processing may entail, for instance, rotating the display orientation of the tile, rendering the tile as a portion of a three dimensional image, or the like. Having rendered pixel values for the tile, the graphics processing block sends the rendered pixel values directly to the device's display controller and partially updates the graphics display memory with them.

Because processing of the frame of graphics data occurs on a tile-by-tile basis, the on-chip memory need only be sized to store a single tile of graphics data, rather than the full frame. Moreover, by sending the rendered pixel values straight to the display controller and partially updating the graphics display memory, the number of memory transactions required to process each tile, and thereby the memory bandwidth consumed by such processing, is reduced. This significant reduction in on-chip memory and memory bandwidth can be particularly beneficial for graphics data processing in mobile terminals where physical area and battery power is limited.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
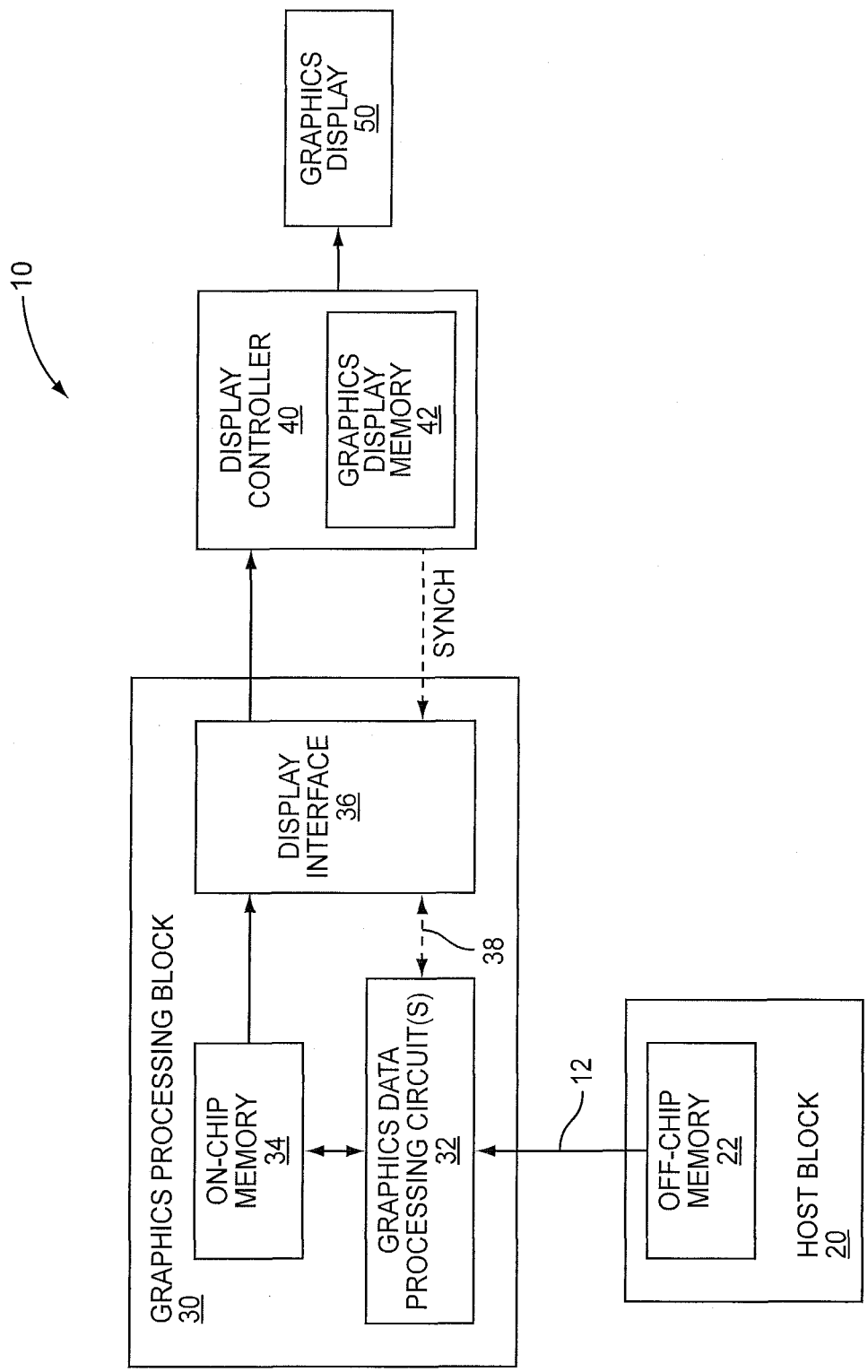
FIG. 1 is a functional block diagram of an electronic device according to one embodiment of the present invention.

FIG. 1 illustrates an electronic device 10, which may be a hand-held device, a laptop device, a mobile communications device, a device mounted in a vehicle, or the like. The device 10 includes a host block 20, a graphics processing block 30, a display controller 40, and a graphics display 50.

The host block 20 includes off-chip memory 22. This memory 22 may be part of the electronic device's main random access memory (RAM), but is nonetheless referred to herein as "off-chip" memory to conveniently distinguish it from any memory located on the graphics processing block 30. The off-chip memory 22 stores a frame of graphics data, e.g., pixel color values, depth values, texture values, etc., written to the memory 22 by an application program for display of an image on the graphics display 50. In some embodiments, the size of the off-chip memory 22, or at least the portion of the memory 22 reserved for graphics data, may correspond to the resolution of the graphics display 50. If the graphics display's resolution is 480 output pixels×640 output pixels, for example, and each output pixel is represented by 4 bytes, the off-chip memory 22 may be approximately (480 pixels×640 pixels)×4 bytes/pixel=1,228,800 bytes in size. The graphics data stored in the off-chip memory 22, however, may not directly correspond to the output pixels actually displayed on the graphics display 50; rather, the frame of graphics data may undergo additional processing by the graphics data processing block 30 before it is sent to the graphics display 50.

To this end, the graphics processing block 30 processes the frame of graphics data in individual blocks, or "tiles," of graphics data. The term "tile" is used herein to refer to a subset, or portion, of the graphics data in an individual frame, such as that which may be related to two or more, but not all, output pixel values for the frame. For instance, the graphics processing block 30 may decompose the frame into sixteen-by-sixteen pixel tiles and process each tile separately and individually. By processing the frame of graphics data in tiles rather than in full, the graphics processing block 30 requires a reduced amount of on-chip memory to process a given frame of graphics data (e.g., only 16×16×4=1024 bytes, rather than the full 1,228,800 bytes).

More particularly, to process tiles of graphics data related to a given frame, the graphics processing block 30 includes one or more graphics data processing circuits 32, an on-chip memory 34, and a display interface 36. For each tile of graphics data, the one or more graphics data processing circuits 32 are configured to fetch graphics data and rendering instructions corresponding to that tile from the off-chip memory 22, e.g., via a system bus 12. The one or more graphics data processing circuits 32 store the graphics data locally in the on-chip memory 34 and then render pixel values for that tile by processing the graphics data in accordance with the rendering instructions. Such processing may entail, for instance, rotating the display orientation of the tile, or more sophisticated processing like rendering the tile as a portion of a three dimensional (3D) image (i.e., vertex processing, texture application, and rasterization). Accordingly, it should be appreciated that the one or more graphics data processing circuits 32 may repeat the process of fetching graphics data and rendering instructions for a tile, and then processing the graphics data in accordance with the rendering instructions, one or more times as needed to render pixel values for the tile. Regardless, the one or more graphics data processing circuits 32 process the frame of graphics data on a tile-by-tile basis, such that the on-chip memory 34 need only be sized to store a single tile of graphics data rather than a full frame.

The size of each tile, and thereby the size of the on-chip memory 34, may be based on the burst memory access capabilities of the device 10. In one embodiment, for instance, the one or more graphics data processing circuits 32 are configured to fetch a tile from the off-chip memory 22 via one or more burst memory accesses to that memory 22. A burst memory access, also known as a burst mode access, refers to a memory access that uses reduced address signaling by retrieving data from consecutive memory locations of the off-chip memory 22. In this case, the size of a tile comprises a pre-determined number of bytes of graphics data, which depends on: (a) the number of bytes of graphics data that the one or more graphics data processing circuits 32 can retrieve via each burst memory access; and (b) the number of burst memory accesses that the one or more graphics data processing circuits 32 are configured to perform before processing the graphics data retrieved. For example, the one or more graphics data processing circuits 32 may be capable of retrieving thirty-two (32) bytes of graphics data via each burst memory access to the off-chip memory 22. If the one or more graphics data processing circuits 32 perform thirty-two (32) of these burst memory accesses in a row before processing the graphics data retrieved, it thereby retrieves 32 bytes/access× 32 accesses=1024 bytes of graphics data. The on-chip memory 34 need only be sized to store approximately this pre-determined number of bytes of graphics data (e.g., 1024 bytes).

Turning now briefly to the details of the display controller 40 and the graphics display 50, the display controller 40 is configured to refresh output pixels of the graphics display 50 based on pixel values stored in graphics display memory 42.

The display controller 40 may, for instance, read the pixel values stored in the graphics display memory 42 and convert or translate them into control signaling understood by the graphics display 50. The graphics display 50, e.g., a liquid crystal display, applies these control signals to activate elements of the display screen. This is done repeatedly over multiple frames of graphics data (e.g., at a steady rate of 60 frames per second, or more) to refresh the output pixels and thereby maintain the brightness and colors of the displayed frames.

Notably, the graphics display memory 42 of the controller 40 is configured to be updated at any given time with only some of the pixel values rendered for a frame of graphics data, rather than having to be updated in full with all pixel values rendered for that frame. Accordingly, once the one or more graphics data processing circuits 32 have rendered pixel values for a tile of a frame (e.g., as perhaps indicated by control signaling 38), the display interface 36 sends those rendered pixel values directly to the display controller 40 and partially updates the graphics display memory 42 with them. This avoids the rendered pixel values of each tile having to first be stored back in the off-chip memory 22 temporarily, until all tiles for the frame have been rendered, and then sent to the display controller 40 as a fully rendered frame. Thus, by sending the rendered pixel values straight to the display controller and partially updating the graphics display memory 42, the number of memory transactions required to process each tile, and thereby the memory bandwidth consumed by such processing, is reduced.

In some cases, the above tile-by-tile processing and partial update of the graphics display memory 42 may risk introducing visual artifacts into the image displayed on the graphics display 50. If, for example, the one or more graphics data processing circuits 32 render pixel values at a rate slower than the display controller 40 refreshes output pixels of the graphics display 50, the display controller 40 may occasionally and periodically control the graphics display 50 to display some rendered pixel values for two or more refresh cycles in a row. This may introduce a page tearing artifact into the image displayed on the graphics display 50. Accordingly, to prevent or mitigate the introduction of visual artifacts, the one or more graphics data processing circuits 32 are configured in one embodiment to render pixel values for a tile at a rate faster than the rate at which the display controller 40 refreshes output pixels of the graphics display 50.

Tile-by-tile processing and partial update of the graphics display memory 42 may also risk introducing visual artifacts in other cases, however, such as if the partial update is not somehow synchronized with the display refresh. If, for example, the graphics display memory 42 implements a single display buffer from which the display controller 40 reads rendered pixel values for refreshing the display 50, the display interface 36 should update parts of the buffer that the display controller has already read in order to avoid introducing a page tearing artifact into the image displayed. Likewise, if the graphics display memory 42 implements multiple buffers from which the display controller 40 alternates reading rendered pixel values, the display interface 36 should update a buffer that the display controller is not currently reading. To ensure this occurs, the display interface 36 in some embodiments is configured to partially update the graphics display memory 42 with the rendered pixel values of a tile in accordance with a synchronization signal SYNCH received from the display controller 42. The synchronization signal SYNCH indicates to the display interface 36 the timing by which the display controller 40 refreshes output pixels of the graphics display 50, and may for instance be transmitted to the display interface 36 periodically, e.g., upon the completion of each refresh cycle. Responsive to this synchronization signal SYNCH, the display interface 36 coordinates partial updates of the graphics display memory 42 so as to avoid the above mentioned conflicts with display refresh.

The partial update of the graphics display memory 42 may also affect the size of each tile, and thereby the size of the on-chip memory 34. In some embodiments, for instance, the display interface 36 is configured to partially update the graphics display memory 42 with a pre-determined number of rendered pixel values. In this case, the on-chip memory 34 need only be sized to store approximately this pre-determined number of rendered pixel values. Of course, this pre-determined number of rendered pixel values may or may not correspond to the pre-determined number of bytes of graphics data retrievable by the one or more graphics data processing circuits 32 via one or more burst memory accesses to the off-chip memory 22. Either may in a sense "limit" the size of the on-chip memory 34, although as described above the graphics processing block 30 advantageously processes a frame of graphics data with a reduced-sized on-chip memory 34 and with a reduced memory bandwidth.

As briefly suggested above, one manner in which the graphics processing block 30 may process a frame of graphics data entails rotating the display orientation of the frame. That is, the graphics processing block 30 in one embodiment rotates a full frame of graphics data by separately rotating individual tiles of graphics data related to that frame. FIGS. 2A-2D illustrate one example.

Figure 2:
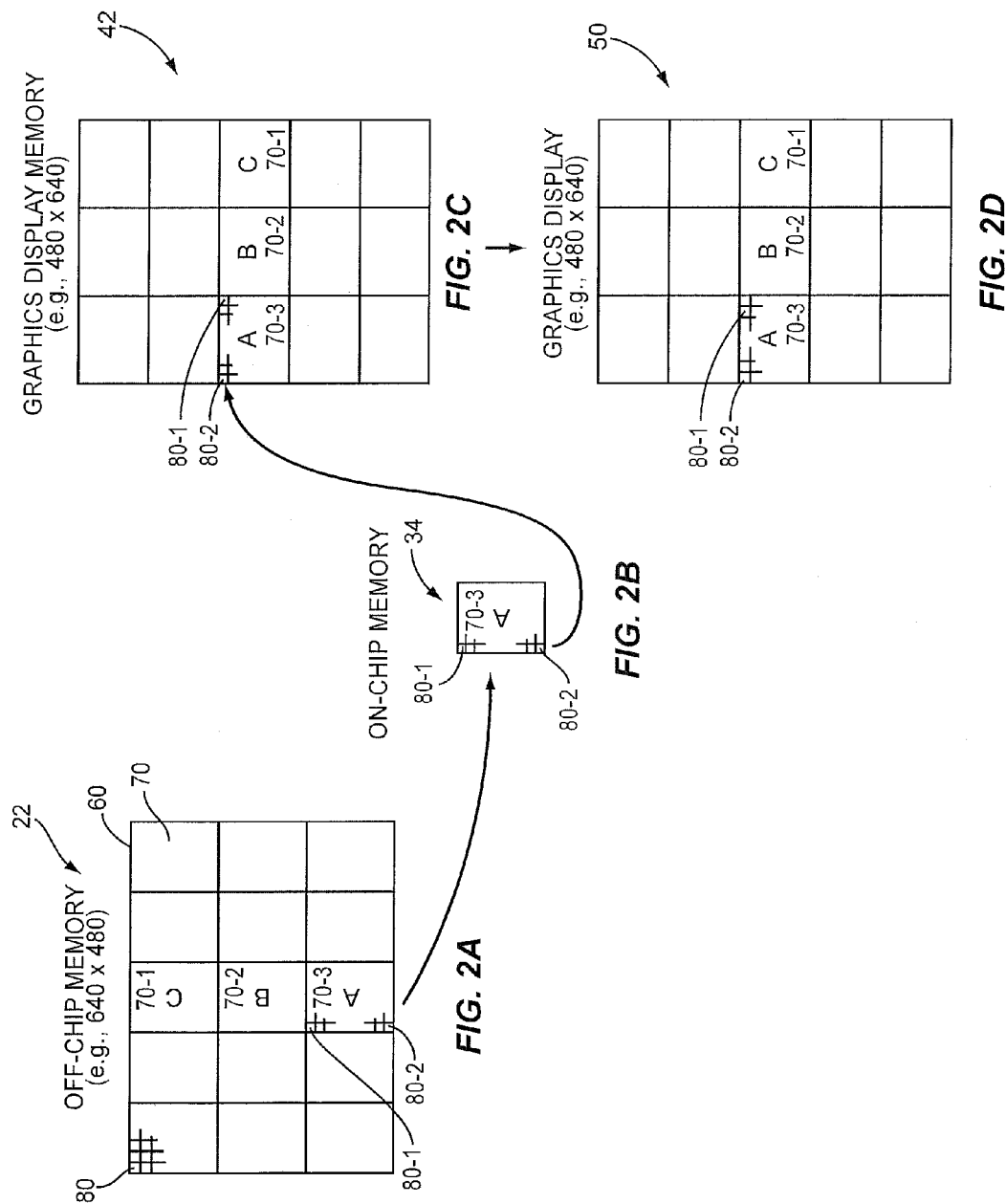
FIGS. 2A-2D illustrate an example of graphics processing according to one embodiment of the present invention.

In FIG. 2A, the off-chip memory 22 stores a full frame 60 of graphics data in a landscape orientation. More particularly, the full frame 60 of graphics data includes a plurality of pixels 80. To store the frame 60 in a landscape orientation, the off-chip memory 22 stores a greater number of pixels 80 along the width of the memory 22 than the number of pixels 80 it stores along the height of the memory 22 (e.g., 640 pixels along the width of memory 22×480 pixels along the height of memory 22).

As illustrated in FIGS. 2C and 2D, however, the graphics display memory 42 stores, and the graphics display 50 displays, a full frame 60 of graphics data in a portrait orientation (e.g., 480 pixels×640 pixels, rather than 640 pixels×480 pixels). Thus, to appropriately display a full frame 60 of graphics data to a user, the device 10 must rotate the display orientation of the full frame 60 as stored in the off-chip memory 22 from a landscape orientation to a portrait orientation. Instead of actually rotating the full frame 60 as a whole, though, the device 10 rotates the full frame 60 by separately rotating individual tiles 70 of the frame 60.

Take, for example, tile 70-3 in FIG. 2A. Because the off-chip memory 22 stores the frame 60 in a landscape orientation, the graphics display 50 would display tile 70-3 sideways as shown in FIG. 2A (e.g., as a sideways letter "A") if the tile 70-3 were sent to the display 50 without rotation. Before sending the tile 70-3 to the display 50, therefore, the one or more graphics data processing circuits 32 are configured to store graphics data corresponding to that tile 70-3 in the on-chip memory 34 (as shown in FIG. 2B), and to then rotate the display orientation of the tile 70-3 so that it is stored in the graphics display memory 42 and displayed on the graphics display 50 in a portrait orientation (e.g., as an upright letter "A" in FIGS. 2C and 2D).

Specifically, the one or more graphics data processing circuits 32 read pixels 80 of tile 70-3 from left-to-right, top-to-bottom (i.e., by first reading the row beginning with the upper-left most pixel 80-1 of tile 70-3 from left to right, and then likewise reading each row there below including the last row beginning with the lower-left most pixel 80-2). Stored in the on-chip memory 34 in this same order, the display orientation of tile 70-3 as stored in the on-chip memory 34 is the same as the display orientation of tile 70-3 as stored in the off-chip memory 22. The one or more graphics data processing circuits 32, however, are configured to then rotate the display orientation of tile 70-3 by reading the on-chip memory 34 from bottom-to-top, left-to-right (i.e., by first reading the column beginning with the lower-left most pixel 80-2 and ending with the upper-left most pixel 80-1, and then likewise reading each column there to the right). The display interface 36 sends the pixels 80 of tile 70-3 to the graphics display memory 42 in this same order, so that the location of each pixel 80-x in the graphics display memory 42 is rotated as compared to the location of that pixels 80-x in the on-chip memory 34 (e.g., because the lower-left most pixel 80-2 in FIG. 2B is read from the on-chip memory 34 and sent to the graphics display memory 42 first, it is stored in the graphics display memory 42 as the upper-left most pixel 80-2 in FIG. 2C). Such effectively rotates the display orientation of the individual tile 70-3 from landscape to portrait orientation.

This process continues sequentially for each tile 70-x of the full frame 60, meaning that the graphics processing block 30 effectively rotates the full frame 60 by separately rotating the individual tiles 70. Because the graphics processing block 30 need only rotate an individual tile 70 at any given time, the amount of on-chip memory 34 required for rotating a full frame 60 is reduced.

Of course, FIGS. 2A-2D have merely illustrated the device 10 using a simple example of rotation. Those skilled in the art will readily appreciate that the processing performed by the device 10 is not limited to rotation, and may entail other types of processing such as 3D rendering or the like.

Moreover, for ease of illustration the device 10 has been described in terms of processing a single frame of graphics data, by separately processing individual tiles of graphics data. Those skilled in the art will of course readily appreciate that the device 10 may process a plurality of frames of graphics data over time, by processing each frame as described herein.

Figure 3:
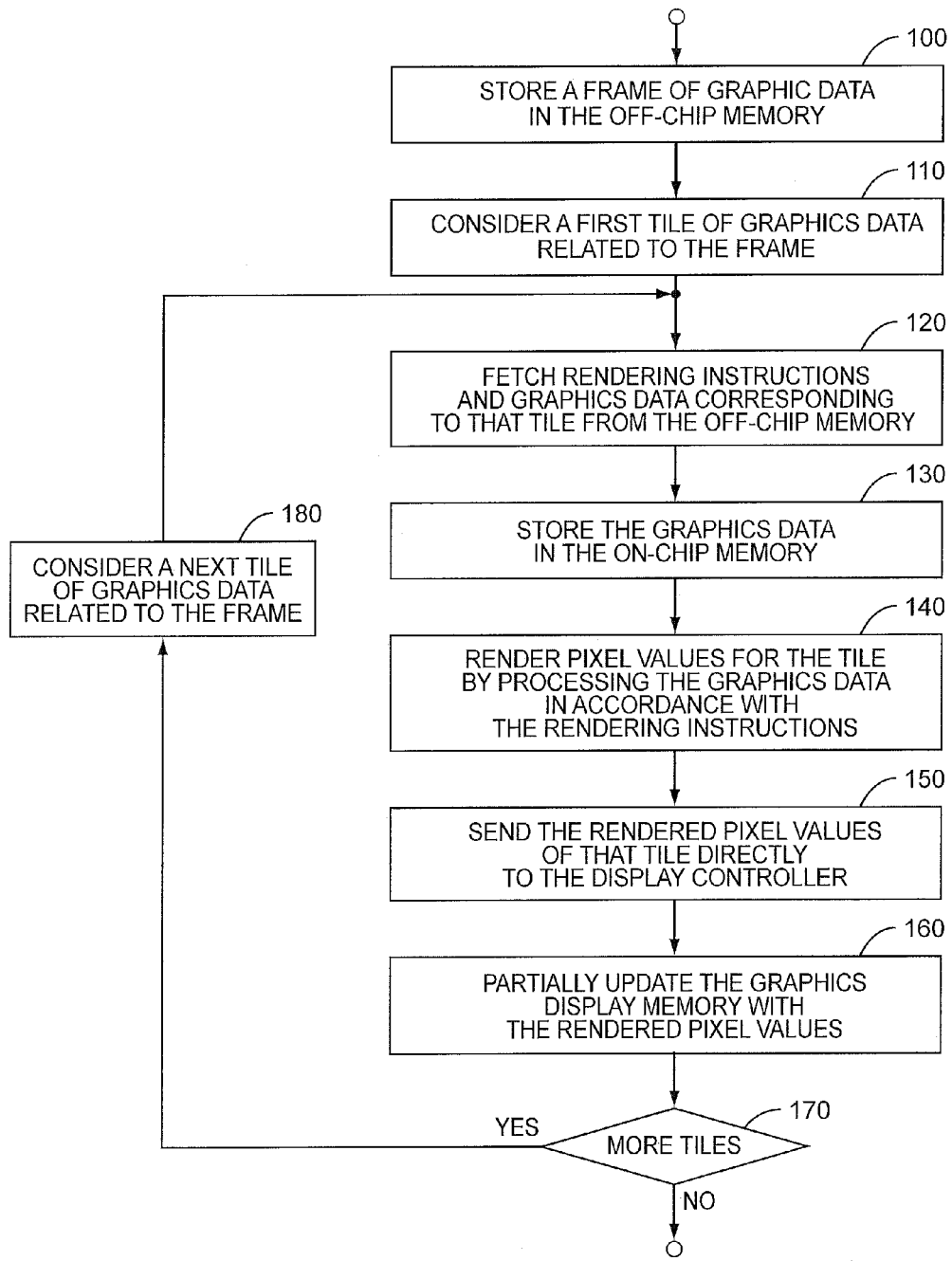
FIG. 3 is a logic flow diagram of a method implemented by an electronic device according to one embodiment of the present invention.

With the above points of variation and implementation of the device 10 in mind, those skilled in the art will appreciate that the device 10 generally performs the method illustrated in FIG. 3 for reduced on-chip memory 34 processing of a given frame of graphics data. According to FIG. 3, the host block 20 stores a frame of graphics data in the off-chip memory 22 (Block 100). For each tile of graphics data related to that frame, the graphics processing block 30 performs various steps. The graphics processing block 30 initially considers a first tile of graphics data related to the frame (Block 110). The graphics processing block 30 fetches rendering instructions and graphics data corresponding to that tile from the off-chip memory 22 (Block 120), and stores the graphics data in the on-chip memory 34 (Block 130). The graphics processing block 30 then renders pixel values for the tile by processing the graphics data in accordance with the rendering instructions (Block 140). Next, the graphics processing block 30 sends the rendered pixel values of that tile directly to the display controller 40 (Block 150) and partially updates the graphics display memory 42 with the rendered pixel values (Block 160). If more tiles are related to the frame that have not yet been processed ('YES' at Block 170), the graphics processing block 30 considers a next tile of graphics data related to the frame (Block 180) and repeats the steps in Blocks 120-160 for that tile. If all tiles related to the frame have been processed ('NO' at Block 170), however, processing of that frame of graphics data ends. This method of processing a given frame of graphics data greatly reduces the size of the on-chip memory 34 and the memory bandwidth required to process that frame. The significant reduction in on-chip memory 34 and memory bandwidth gained from the present invention can be particularly beneficial for graphics data processing in mobile terminals where physical area and battery power is limited, although the invention is not limited to such applications.

Thus, it should be understood that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A graphics processing block of an electronic device configured for reduced on-chip memory processing of a given frame of graphics data stored in off-chip memory, comprising:
   an on-chip memory;
   one or more graphics data processing circuits configured to, for each of two or more tiles of graphics data comprising a portion of the data related to said given frame:
      fetch rendering instructions and the graphics data corresponding to said tile from said off-chip memory;
      store the graphics data corresponding to said tile in the on-chip memory, the size of the on-chip memory approximately equal to the size of any given single one of said tiles so as to store said tile in full; and
      render pixel values for said tile by processing the graphics data corresponding to that tile as stored in the on-chip memory, in accordance with the rendering instructions; and
   a display interface configured to send the rendered pixel values of a tile directly to a display controller of the device and to partially update a graphics display memory of the controller with those rendered pixel values, wherein the graphics display memory of the controller is distinct from the off-chip memory.

2. The graphics processing block of claim 1, wherein the one or more graphics data processing circuits are configured to, for each tile of graphics data, render pixel values for said tile by rotating the display orientation of the graphics data corresponding to said tile.

3. The graphics processing block of claim 1, wherein the size of any given single one of said tiles comprises a pre-determined number of bytes of graphics data, and wherein the one or more graphics data processing circuits are configured to, for each tile of graphics data, fetch graphics data corresponding to said tile from said off-chip memory by retrieving the pre-determined number of bytes of graphics data via multiple burst memory accesses to the off-chip memory.

4. The graphics processing block of claim 1, wherein the size of any given single one of said tiles corresponds to a pre-determined number of rendered pixel values, and wherein the display interface is configured to partially update the graphics display memory with said pre-determined number of rendered pixel values.

5. The graphics processing block of claim 1, wherein the display interface is configured to partially update the graphics display memory with the rendered pixel values of a tile, in accordance with a synchronization signal received from the display controller that indicates the timing by which the display controller refreshes output pixels of a graphics display with rendered pixel values.

6. The graphics processing block of claim 1, wherein the one or more graphics data processing circuits are configured to render pixel values for a tile at a rate faster than the rate at which the display controller refreshes output pixels of a graphics display.

7. The graphics processing block of claim 1, wherein the size of the on-chip memory and the size of any given one of said tiles is fixed.

8. The graphics processing block of claim 1, wherein the display interface is configured to transfer the rendered pixel values of a tile from the on-chip memory directly to the graphics display memory of the controller, wherein the graphics display memory of the controller stores pixel values for a whole frame of graphics data exclusive of the off-chip memory, and wherein the display interface is configured to partially update the graphics display memory by updating only a portion of the pixel values in the graphics display memory with the rendered pixel values of a tile.

9. The graphics processing block of claim 1, wherein the graphics display memory is internal to the display controller and is distinct from the on-chip memory.

10. A method implemented by a graphics processing block of an electronic device for reduced on-chip memory processing of a given frame of graphics data stored in off-chip memory, comprising, for each of two or more tiles of graphics data comprising a portion of the graphics data related to said given frame:
    fetching rendering instructions and the graphics data corresponding to said tile from said off-chip memory;
    storing the graphics data corresponding to said tile in on-chip memory of the graphics processing block, the size of the on-chip memory approximately equal to the size of any given single one of said tiles so as to store said tile in full;
    rendering pixel values for said tile by processing the graphics data corresponding to that tile as stored in the on-chip memory, in accordance with the rendering instructions;
    sending the rendered pixel values of said tile directly to a display controller of the device; and
    partially updating a graphics display memory of the display controller with the rendered pixel values, wherein the graphics display memory of the controller is distinct from the off-chip memory.

11. The method of claim 10, wherein rendering pixel values for said tile comprises rotating the display orientation of the graphics data corresponding to said tile.

12. The method of claim 10, wherein the size of any given single one of said tiles comprises a pre-determined number of bytes of graphics data, and wherein fetching graphics data corresponding to said tile from said off-chip memory comprises retrieving the pre-determined number of bytes of graphics data via multiple burst memory accesses to the off-chip memory.

13. The method of claim 10, wherein the size of any given single one of said tiles corresponds to a pre-determined number of rendered pixel values, and wherein partially updating the graphics display memory with the rendered pixel values comprises partially updating the graphics display memory with the pre-determined number of rendered pixel values.

14. The method of claim 10, wherein partially updating the graphics display memory with the rendered pixel values of a tile comprises partially updating the graphics display memory with the rendered pixel values of a tile, in accordance with a synchronization signal received from the display controller that indicates the timing by which the display controller refreshes output pixels of a graphics display with rendered pixel values.

15. The method of claim 10, wherein rendering pixel values for a tile comprises rendering pixel values for a tile a rate faster than the rate at which the display controller refreshes output pixels of a graphics display.

16. The method of claim 10, wherein the size of the on-chip memory and the size of any given one of said tiles is fixed.

17. The method of claim 10, wherein said sending comprises transferring the rendered pixel values of a tile from the on-chip memory directly to the graphics display memory of the controller, wherein the graphics display memory of the controller stores pixel values for a whole frame of graphics data exclusive of the off-chip memory, and wherein partially updating the graphics display memory comprises updating only a portion of the pixel values in the graphics display memory with the rendered pixel values of a tile.

18. An electronic device configured for reduced on-chip memory display frame processing, comprising:
a graphics display;
a host block comprising off-chip memory configured to store a given frame of graphics data;
a display controller comprising a graphics display memory that is configured to be partially updated with rendered pixel values, wherein the graphics display memory of the controller is distinct from the off-chip memory; and
a graphics processing block comprising:
an on-chip memory;
one or more graphics data processing circuits configured to, for each of two or more tiles of graphics data comprising a portion of the data related to said given frame:
fetch rendering instructions and the graphics data corresponding to said tile from said off-chip memory;
store the graphics data corresponding to said tile in the on-chip memory, the size of the on-chip memory approximately equal to the size of any given single one of said tiles so as to store said tile in full; and
render pixel values for said tile by processing the graphics data corresponding to that tile as stored in the on-chip memory, in accordance with the rendering instructions; and
a display interface configured to send the rendered pixel values of a tile directly to the display controller and to partially update the graphics display memory with those rendered pixel values.

19. The electronic device of claim 18, wherein the one or more graphics data processing circuits are configured to, for each tile of graphics data, render pixel values for said tile by rotating the display orientation of the graphics data corresponding to said tile.

20. The electronic device of claim 18, wherein the size of any given single one of said tiles comprises a pre-determined number of bytes of graphics data, and wherein the one or more graphics data processing circuits are configured to, for each tile of graphics data, fetch graphics data corresponding to said tile from said off-chip memory by retrieving the pre-determined number of bytes of graphics data via multiple burst memory accesses to the off-chip memory.

21. The electronic device of claim 18, wherein the size of any given single one of said tiles corresponds to a pre-determined number of rendered pixel values, and wherein the display interface is configured to partially update the graphics display memory with the pre-determined number of rendered pixel values.

22. The electronic device of claim 18, wherein the display interface is configured to partially update the graphics display memory with the rendered pixel values of a tile, in accordance with a synchronization signal received from the display controller that indicates the timing by which the display controller refreshes output pixels of a graphics display with rendered pixel values.

23. The electronic device of claim 18, wherein the one or more graphics data processing circuits are configured to render pixel values for a tile at a rate faster than the rate at which the display controller refreshes output pixels of a graphics display.

24. The electronic device of claim 18, wherein the size of the on-chip memory and the size of any given one of said tiles is fixed.

25. The electronic device of claim 18, wherein the display interface is configured to transfer the rendered pixel values of a tile from the on-chip memory directly to the graphics display memory of the controller, wherein the graphics display memory of the controller stores pixel values for a whole frame of graphics data exclusive of the off-chip memory, and wherein the display interface is configured to partially update the graphics display memory by updating only a portion of the pixel values in the graphics display memory with the rendered pixel values of a tile.

26. A method implemented by an electronic device for reduced on-chip memory display frame processing, comprising:
storing a given frame of graphics data in off-chip memory of a host block of the device;
for each of two or more tiles of graphics data comprising a portion of the graphics data related to said given frame:
fetching rendering instructions and the graphics data corresponding to said tile from said off-chip memory;
storing the graphics data corresponding to said tile in on-chip memory of a graphics processing block of the device, the size of the on-chip memory approximately equal to the size of any given single one of said tiles so as to store said tile in full;
rendering pixel values for said tile by processing the graphics data corresponding to that tile at the graphics processing block, in accordance with the rendering instructions;
sending the rendered pixel values of said tile from the graphics processing block directly to a display controller of the device; and
partially updating a graphics display memory of the display controller with the rendered pixel values, wherein the graphics display memory of the controller is distinct from the off-chip memory.

27. The method of claim 26, wherein rendering pixel values for said tile comprises rotating the display orientation of the graphics data corresponding to said tile.

28. The method of claim 26, wherein the size of any given single one of said tiles comprises a pre-determined number of bytes of graphics data, and wherein fetching graphics data corresponding to said tile from said off-chip memory comprises retrieving the pre-determined number of bytes of graphics data via multiple burst memory accesses to the off-chip memory.

29. The method of claim 26, wherein the size of any given single one of said tiles corresponds to a pre-determined number of rendered pixel values, and wherein partially updating the graphics display memory comprises partially updating the pre-determined number of rendered pixel values.

30. The method of claim 26, wherein partially updating the graphics display memory with the rendered pixel values of a tile comprises partially updating the graphics display memory with the rendered pixel values of a tile, in accordance with a synchronization signal received from the display controller that indicates the timing by which the display controller refreshes output pixels of a graphics display with rendered pixel values.

31. The method of claim 26, wherein rendering pixel values for a tile comprises rendering pixel values for a tile at a rate faster than the rate at which the display controller refreshes output pixels of a graphics display.

32. The method of claim 26, wherein the size of the on-chip memory and the size of any given one of said tiles is fixed.

33. The method of claim 26, wherein said sending comprises transferring the rendered pixel values of a tile from the on-chip memory directly to the graphics display memory of the controller, wherein the graphics display memory of the controller stores pixel values for a whole frame of graphics data exclusive of the off-chip memory, and wherein partially updating the graphics display memory comprises updating only a portion of the pixel values in the graphics display memory with the rendered pixel values of a tile.

* * * * *